(12) United States Patent
Bellamkonda et al.

(10) Patent No.: US 9,518,873 B2
(45) Date of Patent: Dec. 13, 2016

(54) ELECTRONIC SYSTEM AND METHOD FOR THERMAL MANAGEMENT THEREIN TAKING INTO ACCOUNT SOLAR THERMAL LOADING

(71) Applicant: MOTOROLA MOBILITY LLC, Libertyville, IL (US)

(72) Inventors: Krishna K. Bellamkonda, Lake Zurich, IL (US); Morris B. Bowers, Grayslake, IL (US); Paul B. Crosbie, Grayslake, IL (US); Brett L. Robertson, Mundelein, IL (US); Maninder S. Sehmbey, Hoffman Estates, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 522 days.

(21) Appl. No.: 13/928,405

(22) Filed: Jun. 27, 2013

(65) Prior Publication Data
US 2015/0000889 A1 Jan. 1, 2015

(51) Int. Cl.
*G01K 7/42* (2006.01)
*G06F 1/20* (2006.01)

(52) U.S. Cl.
CPC .............. *G01K 7/42* (2013.01); *G06F 1/206* (2013.01)

(58) Field of Classification Search
CPC .... G06F 1/206; G06F 9/30083; G06F 9/4893; G05D 23/27; G01K 7/42; Y02B 60/1275
(Continued)

(56) References Cited

U.S. PATENT DOCUMENTS 6,397,163 B1 * 5/2002 Hoyt ..................... G06Q 10/08
 206/559
6,616,057 B1 * 9/2003 Kelly ................. B60H 1/00807
 236/49.3
(Continued)

FOREIGN PATENT DOCUMENTS

WO 8807267 A1 9/1988

OTHER PUBLICATIONS

International Searching Authority, International Search Report and Written Opinion for PCT/US2014/044156 mailed Oct. 12, 2014, 10 pages.
(Continued)

*Primary Examiner* — Kenneth M Lo
*Assistant Examiner* — Jason Lin
(74) *Attorney, Agent, or Firm* — McDonnell Boehnen Hulbert & Berghoff LLP (57) ABSTRACT

An electronic system performs thermal management during its operation by proactively taking into account expected solar thermal loading. According to one embodiment, the electronic system determines its location and a solar thermal load value expected to affect its location. The system also determines a temperature offset value based on the solar thermal load value and predicts a future temperature for the system based on the temperature offset value and a then-current temperature for the system (e.g., as may be detected by one or more temperature sensors). The electronic system compares the predicted temperature to at least one threshold and executes a thermal mitigation procedure in the event that the predicted temperature exceeds one or more of the thresholds. According to another embodiment in which the electronic system is transportable, the determined solar thermal load value may include a solar thermal load profile for the system's expected route of travel.

24 Claims, 3 Drawing Sheets

(58) Field of Classification Search
USPC .................. 700/299, 300; 165/287; 374/109
See application file for complete search history.

(56) References Cited

U.S. PATENT DOCUMENTS

| | | | |
|---|---|---|---|
| 8,255,004 B2 | 8/2012 | Huang et al. | |
| 8,374,730 B2 | 2/2013 | Conroy et al. | |
| 8,452,463 B2 | 5/2013 | Cox et al. | |
| 2003/0040867 A1* | 2/2003 | Fish | G08G 1/0962 701/487 |
| 2005/0273208 A1* | 12/2005 | Yazawa | G01K 7/425 700/299 |
| 2007/0067136 A1* | 3/2007 | Conroy | G06F 1/206 702/130 |
| 2007/0156257 A1* | 7/2007 | Peters | G06Q 99/00 700/22 |
| 2008/0034232 A1* | 2/2008 | Rangarajan | G06F 1/206 713/300 |
| 2009/0020110 A1 | 1/2009 | Lauritzen | |
| 2009/0242186 A1* | 10/2009 | Koshiyama | G05D 23/1931 165/288 |
| 2010/0030395 A1* | 2/2010 | Shimotono | G06F 1/206 700/300 |
| 2010/0223171 A1 | 9/2010 | Baller | |
| 2012/0098669 A1 | 4/2012 | Lockwood | |
| 2012/0266864 A1 | 10/2012 | Wright | |
| 2012/0271480 A1 | 10/2012 | Anderson et al. | |
| 2012/0272078 A1 | 10/2012 | Anderson et al. | |
| 2013/0066585 A1* | 3/2013 | Saito | F24F 11/006 702/134 |
| 2013/0190940 A1* | 7/2013 | Sloop | G05B 15/02 700/291 |

OTHER PUBLICATIONS

Strigo et al., "Effect of Ambient Temperature on Human Pain and Temperature Perception" 2000 American Society of Anesthesiologists, Inc., Anesthesiology, V92, No. 3, Mar. 2000, pp. 699-707.

Slaby et al., "Method and Apparatus for Adjusting Portable Electronic Device Opeartion Based on Ambient Temperature" U.S. Appl. No. 14/024,050 filed Sep. 11, 2013, 32 pages.

Shillcutt, Kimberly J.: "Solar Based Navigation for Robotic Explorers", A Thesis Submitted in Partial Fulfilment of the Requirements OFR the Degree of Doctor of Philosphy in the Robotics Institute of Carnegie Mellon University, 2000, all pages.

Headlines, Acura Media Newsroom—RDX—2013 RDX—Interior, 2013 RDX—Interior, Text Only 2013 Acura RDX technical document.doc, Mar. 26, 2012, www.hondanews.com/channels/acura-automobiles-rdx/releases/2013-rdx-interior, downloaded from internet: Mar. 15, 2013, all pages.

Flight Planning & Navigation websites aviation links, AVIATION LINKS, www.garmin-air-race.freeola.com/linkslisting/34.htm, downloaded from internet: Mar. 12, 2013, all pages.

* cited by examiner

ELECTRONIC SYSTEM AND METHOD FOR THERMAL MANAGEMENT THEREIN TAKING INTO ACCOUNT SOLAR THERMAL LOADING

FIELD OF THE INVENTION

The present invention relates generally to thermal management of electronic systems and, more particularly, to an electronic system and a thermal management method used therein that takes into account solar thermal loading.

BACKGROUND

Mobile and portable electronic systems, such as smartphones, tablet computers, multimedia devices, motor vehicles, and various other mobile and portable processor-based systems, utilize components that may respond or perform poorly, or even become dangerous, under excessive heating conditions. For example, lithium-based batteries, which are currently used in many types of mobile and portable electronic systems, can fail, ignite, or even explode when exposed to high temperatures (whether as a result of self-heating or a combination of self-heating and heating of other system components). Additionally, processors and other circuit components may fail or function inadequately when exposed to excessive temperatures.

Due to the undesirable results which can occur due to excessive heating within electronic systems, such systems typically include thermal management or protection circuits that monitor the temperatures within the systems and execute thermal mitigation procedures upon detecting undesirable temperatures. Thermal management circuits typically include one or more thermistors having resistances that change with temperature. The temperature-varying nature of a thermistor's resistance results in a temperature-varying output voltage, which can be converted by a processor into an estimated temperature based on the thermistor's voltage-to-temperature relationship. While the use of thermistors assists with thermal management, such components are reactive in nature, thereby resulting in a reactive thermal management system. The drawback to reactive thermal management schemes is that once an undesirable temperature is detected, aggressive thermal mitigation procedures rapidly take place. Such procedures may have undesired consequences, such as preventing receipt of incoming data or transmission of emergency information.

One external factor that causes electronic system heating is a rise in ambient temperature surrounding the electronic system. Ambient temperature may rise naturally, such as a result of solar heating, or mechanically, such as due to the use of other heat-generating devices or systems (e.g., other electronic systems or a heating, ventilation, and air conditioning (HVAC) system) proximate the electronic system. Solar heating is an especially important external heating factor where an electronic system or its environment is directly exposed to solar radiation. For example, where the electronic system is a portable electronic device that is directly exposed to solar radiation, the ambient temperature rise may include heating of the ambient air as well as heating of the electronic device's housing due to absorption of solar energy.

Figure 1:
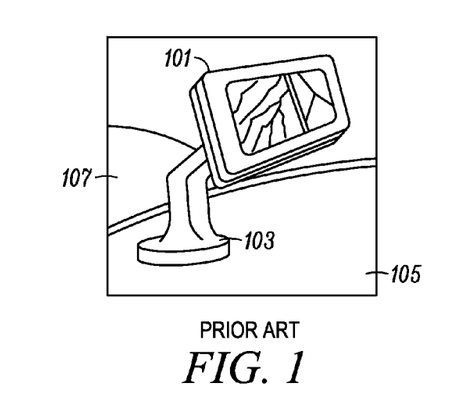
FIG. 1 illustrates a prior art electronic system positioned in a docking station that is subject to solar heating by virtue of the docking station's placement on a dashboard of an automobile.

One example of an electronic system exposed to solar heating is illustrated in FIG. 1. In this example, an electronic system 101 (in this case, a smartphone) is positioned in a docking station 103 secured to a dashboard 105 of an automobile. The electronic system 101 is directly exposed to solar radiation (and therefore solar heating) through the automobile's windshield 107. Depending on the time of day, time of year, geographic location of the automobile, cloudiness of the sky, color of the dashboard 105 and/or the electronic system's housing, and other factors, the solar thermal load applied to the electronic system 101 may be sufficient, either alone or in combination with system operation-related heating, to activate thermal mitigation procedures within the electronic system 101. However, because such mitigation procedures are reactive and often aggressive once activated, they may result in undesirable, rapid degradations in performance of the electronic system.

Skilled artisans will appreciate that elements in the figures are illustrated for simplicity and clarity and have not necessarily been drawn to scale. For example, the dimensions of some of the elements in the figures may be exaggerated alone or relative to other elements or the elements may be shown in block diagram form to help improve the understanding of the various exemplary embodiments of the present invention.

DETAILED DESCRIPTION

Generally, the present invention encompasses an electronic system and a thermal management method used therein that takes into account solar thermal loading. The electronic system may be a portable or transportable electronic device (such as a cell phone, a smartphone, a portable media player, a tablet computer, a laptop computer, a personal digital assistant, a handheld or portable gaming device, a camera, a camcorder, a handheld GPS unit, a wireless earpiece or headset, or a portable health monitoring device) or a mobile electronic system that utilizes batteries for primary or auxiliary power (such as one or more systems in an electric vehicle, a hybrid electric vehicle, an airplane or other aerospace system, or a boat or other marine vehicle).

According to one exemplary embodiment of the present invention, the electronic system includes one or more temperature sensors and a processing subsystem operably coupled to the temperature sensors. Each temperature sensor produces an output representative of a sensed temperature. For example, where the electronic system is a smartphone, the electronic system may include temperature sensors positioned proximate the battery (e.g., in the battery pack), the power amplifier (e.g., on a printed circuit board and/or within the amplifier's transistor die), or a built-in camera, as well as in other locations as appropriate. In other electronic systems, temperature sensors may be included and positioned so as to monitor critical temperatures within the particular electronic systems. The sensor outputs may be coupled directly or indirectly (e.g., through one or more other components) to the processing subsystem.

The processing subsystem, which may include one or more processors, operates in accordance with stored operating instructions to, among other things, perform a variety of functions relating to thermal management of the electronic system. In accordance with one exemplary embodiment, the stored operating instructions for controlling the processing subsystem to implement various features of the present invention may be referred to as a "thermal management process." According to one exemplary embodiment of the thermal management process, the processing subsystem determines a location of the electronic system, a solar thermal load value representing a solar thermal load expected to affect the location of the electronic system, and a temperature offset value based on the solar thermal load value. Additionally, the processing subsystem receives an output from each temperature sensor (e.g., an analog voltage or digital representation thereof) and determines a sensed temperature based on the received output (e.g., by referring to a temperature versus voltage lookup table stored in the processing subsystem or in a memory of the electronic system). The processing subsystem then predicts a future temperature for the electronic system based on the temperature offset value and the sensed temperature or temperatures. For example, the processing subsystem may sum the solar load-based temperature offset value and the maximum sensed temperature to arrive at the predicted temperature for the electronic system. After a future temperature for the electronic system has been predicted, the processing subsystem compares the predicted temperature to one or more thresholds and executes a thermal mitigation procedure for the electronic system in the event that the predicted temperature exceeds a threshold.

In an alternative embodiment, the processing subsystem may include software (including firmware and/or middleware) and/or hardware modules that perform functions relating to providing thermal management based on predicted solar thermal load. In such a case, the electronic system may include, among other things, at least one temperature sensor, a location determining module, a solar thermal load estimation module, and a thermal management module. In this embodiment, each temperature sensor produces an output representative of a sensed temperature and the location determining module is operable to determine a location of the electronic system. The solar thermal load estimation module is operable to determine a solar thermal load value representing a solar thermal load expected to affect the location of the electronic system and determine a temperature offset value based on the solar thermal load value. The thermal management module, which is operably (e.g., directly, indirectly, and/or logically) coupled to the temperature sensor(s) and the solar thermal load estimation module, is operable to receive outputs from the temperature sensor (s), determine a sensed temperature based on each temperature sensor output, predict a future temperature for the electronic system based on the temperature offset value determined by the solar thermal load estimation module and the sensed temperature or temperatures, compare the predicted temperature to one or more thresholds, and execute a thermal mitigation procedure for the electronic system in the event that the predicted temperature exceeds one or more of the thresholds.

In another embodiment and prior to determining the solar thermal load value, the processing subsystem determines whether the electronic system is likely to be exposed to solar heating during its operation. If the electronic system is likely to be exposed to solar heating during its operation, then the processing subsystem determines the solar thermal load value. In other words, in this embodiment, the determination of the solar thermal load value occurs only after the processing subsystem determines that the electronic system is likely to be exposed to solar heating during its operation. The determination of whether the electronic system is likely to be exposed to solar heating during operation may be based on a variety of factors, including the time of day, the day of the year, the electronic system's location (including whether or not the electronic system is mounted in a vehicle window-mount or dashboard-mount docking station), and/or the expected solar flux intensity at such location.

In another embodiment, the processing subsystem may determine a location of the electronic system by determining an expected route of travel for the electronic system based on a then-current location of the electronic system and a destination location for the electronic system. For example, the processing subsystem may receive output data from a locally or remotely executing navigation application to determine an expected route of travel based on current and destination location inputs entered by a user of the electronic system. Additionally, where the electronic system includes a display operably coupled to the processing subsystem, the processing subsystem may execute a thermal mitigation procedure by determining and displaying on the display an alternative route of travel that is expected to incur less solar heating than the expected route of travel. For example, using data generated or retrieved from a locally or remotely accessible solar flux estimating application and controlling execution of a locally or remotely executing navigation application, the processing subsystem may determine one or more routes of travel that will incur less solar heating than the expected route of travel. The processing subsystem may then display the routes on the display for use by the electronic system user. The displayed alternative route or routes may optionally identify a preferred route or use a visual indication (e.g., color code or other indicia) to identify expected solar heating levels of the determined alternative routes.

In a further embodiment in which an expected route of travel is determined, the electronic system may determine a solar thermal load profile for at least part of the expected route of travel. For example, the electronic system may divide the expected route of travel into two or more route segments and estimate solar thermal loads for some or all of the route segments to create the solar thermal load profile. Depending on the particular expected route of travel and other factors, each route segment may be determined based upon distance or time. For example, each route segment may be based upon time where the expected route of travel is a relatively short distance, but the electronic system determines that the system will be hand carried by its user over the distance. Alternatively, each route segment may be determined based upon distance where the electronic system determines that the expected route of travel is longer than could be typically traveled by foot and/or that the electronic system is mounted in a vehicular docking station.

In a further embodiment, the electronic system may include memory operable to store a lookup table of temperature offset values versus solar thermal load values. The lookup table may be prestored in the memory based on laboratory test data, empirical field data, or numerical simulation data establishing how much, if any, the temperature within the particular electronic system rises in response to imparted solar flux. In this embodiment, after the processing subsystem determines the solar thermal load value for the expected solar thermal load, the processing subsystem may determine the corresponding temperature offset value by reading or retrieving it from the lookup table or by interpolating it from the lookup table (e.g., where the determined solar thermal load value resides between two stored solar thermal load values). In a further embodiment, each temperature offset value stored in the lookup table may be associated with a range of solar thermal load values instead of a single solar thermal load value. In such a case, the processing subsystem may determine the temperature offset value by selecting the stored temperature offset value corresponding to the solar thermal load value range containing the determined solar thermal load value.

In yet another embodiment, the processing subsystem may compare the predicted temperature to a series of thresholds and execute a thermal mitigation procedure tailored to how the predicted temperature relates to the thresholds. For example, the processing subsystem may compare the predicted temperature to a first threshold corresponding to a first thermal mitigation procedure. If the predicted temperature exceeds the first threshold, the processing subsystem may execute the first thermal mitigation procedure. In one embodiment, the first threshold may be a maximum allowable temperature for the electronic system and the first thermal mitigation procedure may be a most aggressive mitigation procedure. For example, the first mitigation procedure may include reducing the maximum operating frequency of an application processor of the electronic system, reducing a refresh rate for a display of the electronic system, reducing an upload data rate, reducing a download data rate, and/or reducing a brightness of the display. Additionally, if the predicted temperature does not exceed the first threshold, the processing subsystem may compare the predicted temperature to a second threshold corresponding to a second, less aggressive thermal mitigation procedure. In this case, if the predicted temperature is between the first and second thresholds, the processing subsystem may execute the second thermal mitigation procedure. Additional thresholds may be established as desired to optionally create a progressive thermal mitigation approach to proactively and gradually reduce electronic system functionality to minimize impact on the user while maintaining an acceptable operating temperature for the system.

In a further embodiment, the processing subsystem may predict the electronic system's temperature on a repeated basis, such as periodically, algorithmically, or upon occurrences of certain triggers, such that the thermal mitigation procedure may be modified or ceased over time. Repeated predictions of the electronic system's temperature enables the predictions to take into account the then-current temperature and/or location for the electronic system to improve the prediction efficacy.

In a further embodiment in which the electronic system determines its expected route of travel, the electronic system may estimate a speed of travel along the expected route, estimate a time at which the predicted temperature will occur based on the solar thermal load profile for the route and the estimated speed of travel, and perform one or more functions prior to the time at which the predicted temperature is expected to occur. For example, if based on the solar thermal load profile for the route and the estimated speed of travel the electronic system is expected to reach a temperature above a thermal mitigation threshold within a particular amount of time (e.g., 15 minutes or any other length of time), the electronic system may take preemptive measures to perform functions likely to result in more excessive heat generation prior to expiration of the particular amount of time. Functions likely to result in more excessive heat generation may include, for example, functions requiring substantial processing or functions that use of one or more transceivers (modems) of the system (e.g., data transmissions or downloads).

In yet another embodiment, the thermal management process executed by the processing subsystem may provide a notification service to other applications executed by the processing subsystem in the event that the thermal management process predicts that the temperature of the electronic system will exceed a mitigation threshold. In such a case, the other applications may logically subscribe to the thermal management process and receive thermal mitigation notifications from the thermal management process in advance of the processing subsystem performing any or certain thermal mitigation actions. For example, the thermal management process may send notifications to subscribed applications after it has predicted that any thermal mitigation procedure will be occurring or may only send notifications when a certain activities relating to thermal mitigation will be occurring, such as reducing of the application processor's frequency or speed. The notifications may indicate an amount of time until the thermal mitigation activities will commence to provide the subscribed applications a time duration within which to take preventive measures, such as saving data, completing transmissions, alerting a user, and so forth.

By accounting for the impact of the solar thermal loading expected to affect an electronic system, the present invention provides a thermal management approach that takes into account a heat generation source not typically accounted for in prior art portable electronic systems. Additionally, the thermal management protocol advanced by the present invention is proactive and enables the electronic system to take preemptive action so as to avert a thermal-related shutdown or to conclude certain actions in advance of a thermal-related reduction in performance or functionality. Further, through the optional use of multiple thresholds and multiple associated thermal mitigation procedures, the present invention facilitates a gradual reduction in system performance over time so as to minimize the effects on the system user and potentially avoid the use of more extreme thermal mitigation measures. Finally, by optionally providing notice of upcoming thermal mitigation to other applications running in the electronic system, the present invention allows such applications to take preventive action in advance of the thermal mitigation procedures. As a result, the present invention provides an improved thermal management approach for electronic systems exposed to solar radiation.

Figure 2:
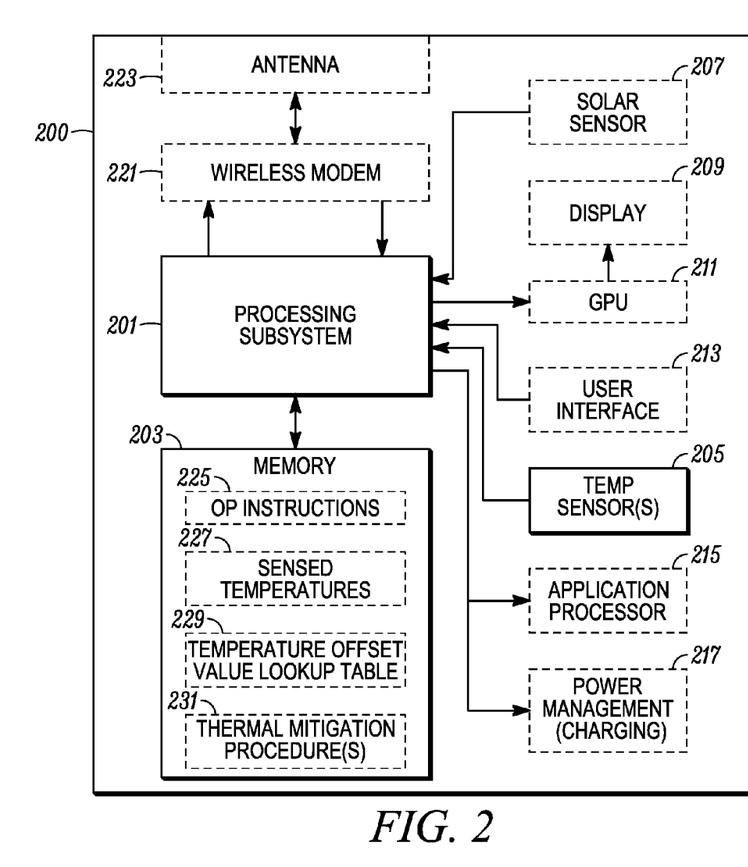
FIG. 2 is an electrical block diagram of an electronic system that performs thermal management taking into account solar thermal loading, in accordance with a first exemplary embodiment of the present invention.
Figure 3:
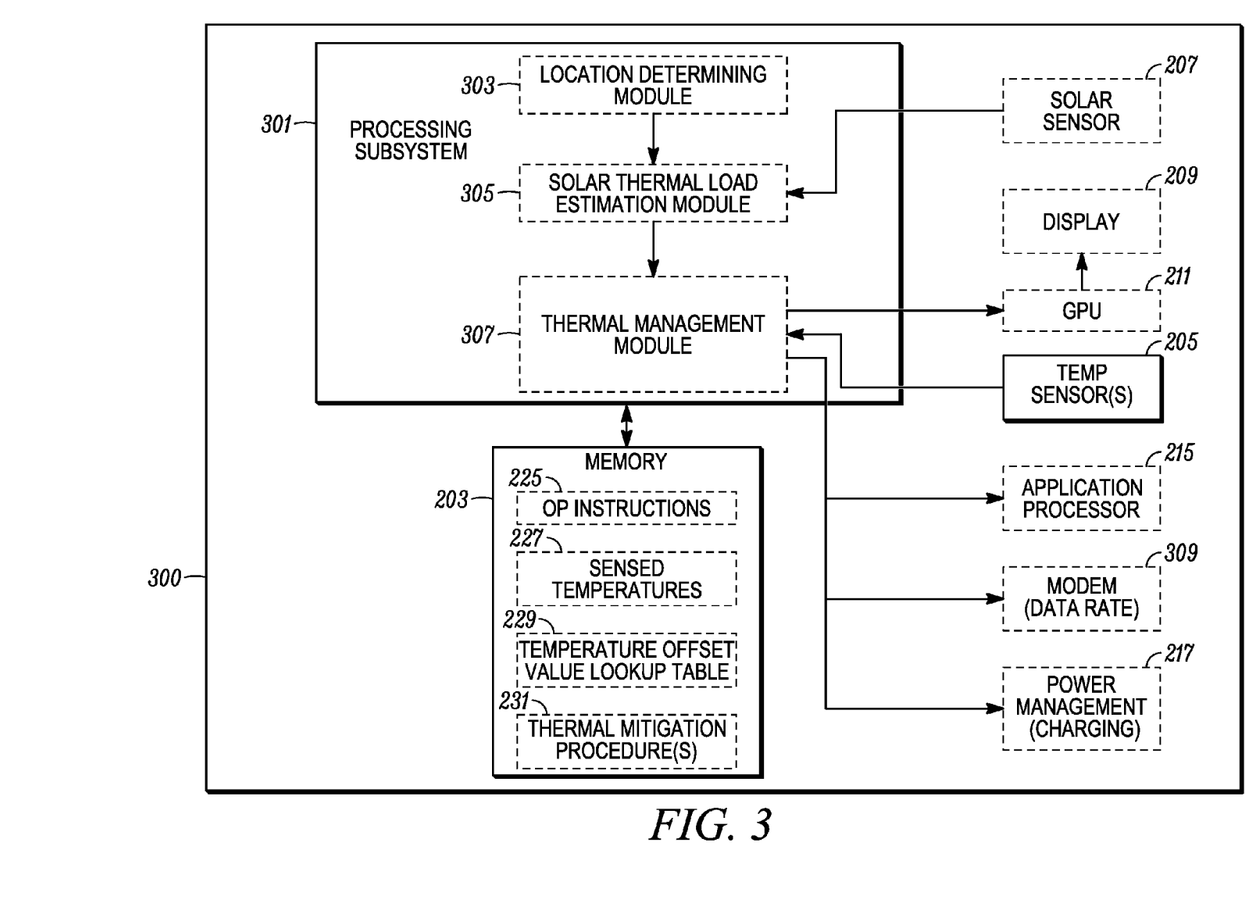
FIG. 3 is an electrical block diagram of an electronic system that provides thermal management taking into account solar thermal loading, in accordance with a second exemplary embodiment of the present invention.
Figure 4:
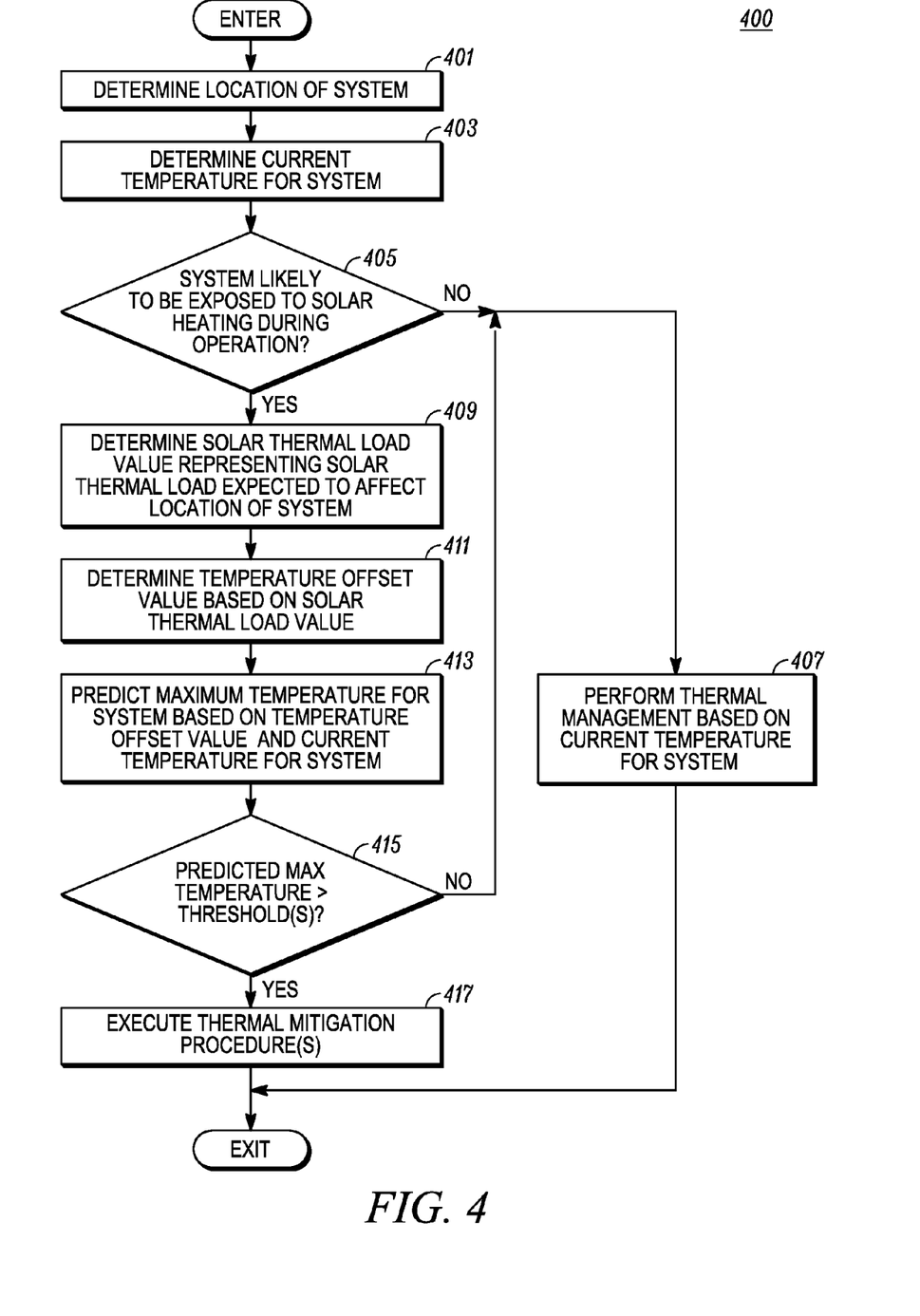
FIG. 4 is a logic flow diagram of steps executed by an electronic system to perform thermal management by proactively taking into account solar thermal loading, in accordance with an exemplary embodiment of the present invention.

Embodiments of the present invention can be more readily understood with reference to FIGS. 2-4, in which like reference numerals designate like items. FIG. 2 illustrates an electrical block diagram of an electronic system 200 that performs thermal management taking into account solar thermal loading, in accordance with a first exemplary embodiment of the present invention. The electronic system 200 includes, inter alia, a processing subsystem 201, memory 203, and one or more temperature sensors 205. Depending upon the particular implementation and function of the electronic system 200, the system 200 may further include a solar sensor 207, a display 209, a graphics processing unit (GPU) 211, a user interface 213, an application processor 215, power management circuitry 217 which controls charging of a rechargeable battery (not shown), a wireless modem 221, and an antenna system 223. The various components used to implement the remainder of the electronic system 200 depend on the type of system 200 and are not critical to an understanding of the present invention.

The processing subsystem 201 may include one or more microprocessors, one or more microcontrollers, one or more digital signal processors (DSPs), one or more state machines, logic circuitry, or any other device or combination of devices that processes information based on operating or programming instructions 225 stored in the memory 203. One of ordinary skill in the art will appreciate that the processing subsystem 201 can be implemented using multiple processors as may be required to handle the processing requirements of the present invention and the various other included functions of the electronic system 200. One of ordinary skill in the art will further recognize that when the processing subsystem 201 has one or more of its functions performed by a state machine or logic circuitry, the memory containing the corresponding operating instructions 225 can be embedded within the state machine or logic circuitry as opposed to being external to the processing subsystem 201, as is the electronic system's internal memory 203 as illustrated in FIG. 2.

The memory 203 may store a variety of information in accordance with embodiments of the present invention, including operating instructions 225 for use by the processing subsystem 201 to implement features of the present invention, sensed temperature values 227 resulting from temperatures sensed by the temperature sensors 205, a temperature offset value lookup table 229, and one or more thermal mitigation procedures 231. The memory 203 may also optionally store other applications (not shown) to be executed by the processing subsystem 201 or other processors of the electronic system 200 during operation of the electronic system 200.

The temperature offset value lookup table 229 may be loaded into the memory 203 during manufacturing of the electronic system 200 or at the point of sale or service activation and identifies temperature offset values to be used in response to expected solar thermal load values determined by the processing subsystem 201 during operation of the electronic system 200. Each temperature offset value may be determined in a laboratory environment for the particular electronic system 200 and represents an amount of temperature that is to be summed with a temperature sensed or measured by the electronic system 200 based on an associated amount of solar thermal load (solar flux) expected to affect a location of the electronic system 200. Thus, the solar thermal load values stored in the temperature offset value lookup table 229 represent the temperature rise expected on or within the electronic system 200 as a result of associated solar thermal loads. Each temperature offset value stored in the temperature offset value lookup table 229 may correspond to a particular solar thermal load value or each temperature offset value may correspond to a range of solar thermal load values.

The stored thermal mitigation procedures 231 include instructions for causing the processing subsystem 201 to adjust functionality of the electronic system 200 to reduce heat generated by the system 200. In accordance with the present invention, one or more thermal mitigation procedures 231 may be stored in memory 203 for execution by the processing subsystem 201. For example, according to one embodiment of the present invention, three thermal mitigation procedures 231 may be stored in memory 203 and any one of the procedures 231 may be triggered for execution when the predicted temperature for the electronic system 200 falls within an associated temperature range. Those of ordinary skill in the art will readily recognize and appreciate that any number of thermal mitigation procedures may be stored in memory 203 to meet the thermal management demands of the particular electronic system 200.

The memory 203 may be separate from the processing subsystem 201 as depicted in FIG. 2 or be integrated into the processing subsystem 201 as discussed above. The memory 203 can include random access memory (RAM), read-only memory (ROM), flash memory, electrically erasable programmable read-only memory (EEPROM), and/or various other forms of memory as are well known in the art. It will be appreciated by one of ordinary skill in the art that the various memory components can each be a group of separately located memory areas in the overall or aggregate system memory 203 and that the system memory 203 may include one or more individual memory elements.

Each temperature sensor 205 may include a thermistor or any other electrical circuit device that exhibits a predictable change in electrical characteristics (e.g., output voltage) based on temperature. The temperature sensor 305 may include other components, such as resistors, thermocouples, infrared sensors, diodes, and/or transistors, as may be necessary to produce a desirable range of temperature-dependent outputs (e.g., output voltages) for sensing or detection by the processing subsystem 201. The processing subsystem 201 may refer to a sensor lookup table (not shown) stored in memory 203 to determine a sensed temperature based on an output received from a temperature sensor 205. The sensor lookup table essentially represents, in discrete form, the temperature versus voltage curve for the temperature-dependent component (e.g., thermistor) of the temperature sensor 205. The electronic system 200 may include one or more temperature sensors 205, with the quantity of temperature sensors 205 being selected based on the design and critical temperature requirements of the electronic system 200. In one embodiment in which the electronic system 200 is a smartphone, the electronic system 200 may include three or more temperature sensors 205, with one temperature sensor 205 being located proximate the smartphone's battery (e.g., in the battery pack), another temperature sensor 205 being located proximate the power amplifier in the transmitter portion of the modem 221, and the third temperature sensor 205 being located proximate an internal camera of the smartphone. Those of ordinary skill in the art will readily recognize and appreciate that the locations of the temperature sensors in the aforementioned exemplary smartphone embodiment are merely illustrative and that the positioning and quantity of the temperature sensors 205 may vary to meet the thermal management needs of the particular electronic system 200.

When included, the solar sensor 207 may be a conventional, miniature solar sensor that detects varying levels of solar flux. The output of the solar sensor 207 may be supplied to the processing subsystem 201 either directly or through an analog-to-digital converter (ADC). The optional solar sensor 207 may be used to enable the processing subsystem 201 to determine that the electronic system 200 is in a location that is subject to solar thermal loading and, therefore, in need of the thermal management process of the present invention. In other words, the output of the solar sensor 207 may be used as a trigger for executing the thermal management process of the present invention. For example, the processing subsystem 201 may refrain from determining the effect of solar thermal loading on the electronic system 200 until a threshold level of solar flux (e.g., 300 W/m²) is detected by the solar sensor 207.

When included, the display 209 may be any conventional or future-developed display, such as a liquid crystal display (LCD), a plasma display, a light emitting diode (LED) display, an organic LED (OLED) display, or any other display technology. The display 209 includes a display screen and appropriate conventional drivers, and may optionally include a GPU 211 for illuminating various portions (e.g., pixels) of the display screen as instructed by the processing subsystem 201. Alternatively, the GPU 211 may be separate from the display 209 (e.g., an integrated circuit (IC) that is separate from the IC containing the display drivers), as illustrated in FIG. 2. The GPU 211 may be any conventional IC used for performing graphics processing.

The user interface 213, when included, may be any conventional user interface or combination of conventional user interface components. For example, the user interface 213 may include rocker keys, buttons, a keypad, a keyboard, a scroll wheel, a thumbwheel, one or more microphones and associated speech conversion/processing software, one or more speakers, a touchpad, a touchscreen incorporated into a display screen of the display 209, and/or any other now-known or future-developed user interface technology.

The application processor 215 is a conventional processor or set of processors configured for executing various operating system-specific applications that are stored in or acquired by the electronic system 200. For example, where the electronic system 200 is a smartphone running the Android operating system, the application processor 215 may be responsible for executing the operating system and applications that run in it. However, the application processor 215 would not normally be involved in executing other functions of the smartphone, such as the wireless communications functionality, or coordinating functions within the smartphone, although applications executed by the application processor 215 may require use of the wireless communications functionality and coordination provided by other system processors (e.g., the smartphone's main central processor and baseband wireless chipset).

The optional power management circuitry 217 may control charging of a rechargeable battery when such a battery supplies power for the electronic system 200. The power management circuitry may be implemented into a power management IC (PMIC), as is well known in the art.

The wireless modem 221 and antenna system 223 may be included where the electronic system 200 is capable of wireless communications. The wireless modem 221 is generally used herein to refer to the modems and transceivers used to provide all wireless communication functionality for the electronic system 200. Thus, as used herein, the wireless modem 221 may include one or more wide area wireless modems (e.g., such as are used to access cellular or satellite communications systems) and/or one or more short-range wireless modems (e.g., such as are used to access short-range communication networks, including Wi-Fi, Bluetooth, Zigbee, Wi-Lan, and other short-range networks). The antenna system 223 may be active or passive and accommodates the wireless communication functionalities of the wireless modem 221, as is known in the art.

FIG. 3 is an electrical block diagram of an electronic system 300 that is an alternative configuration to the electronic system 200 of FIG. 2. In particular, FIG. 3 illustrates various hardware and software (including middleware and firmware) modules that may be used to implement the thermal management features of the electronic system's processing subsystem 301. The hardware and software modules include a location determining module 303, a solar thermal load estimation module 305, and a thermal management module 307. The location determining module 303 may be implemented as a global positioning system (GPS) receiver chipset, associated antenna, memory, and software configured to receive positioning data from GPS satellites and convert the received data to a location using trilateration. The location determined by the location determining module 303 may be expressed in latitude and longitude or as a physical address where the memory 203 stores map data from which an address can be determined from the received positioning data. Alternatively, the location determining module 303 may be implemented as a GPS receiver and a software program that accesses and supplies latitude and longitude data via a modem 309 (which may be a wireless modem) to a location-determining program, such as Google Maps or Google Now, to obtain the electronic system's current location.

The solar thermal load estimation module 305 may be implemented as a software module that accesses, via a modem 309 (which may be a wireless modem), one or more remotely stored databases or applications which determine and/or estimate then-current and future levels of solar flux at locations on the earth's surface. One such application that provides solar flux levels for the United States and other areas of North America is the Simple Model of the Atmospheric Radiative Transfer of Sunshine (SMARTS), which is available for download from the website of the U.S. Department of Energy's National Renewable Energy Laboratory (NREL). Additionally or alternatively, the solar thermal load estimation module 305 may access, via the modem 309, weather feeds from various locations (e.g., national weather services or various private meteorological companies, such as the Weather Channel in the United States) to obtain weather data, including earth surface level solar load or flux data, for use in estimating solar thermal load in accordance with the present invention. In response to estimating solar thermal load, the solar thermal load estimation module 305 may be configured to determine a temperature offset based on the estimated solar thermal load by retrieving the appropriate offset from the temperature offset value lookup table 229 stored in system memory 203.

The thermal management module 307 may be implemented as the hardware portion of a processor that receives outputs from the system's temperature sensors 205 and as a software module. In such an embodiment, the software module may be programmed to determine sensed temperatures based on the received temperature sensor outputs (e.g., by retrieving temperature values from one or more lookup tables stored in memory 203 based on the temperature sensor output data), store the sensed temperatures 227 in memory 203, receive the temperature offset from the solar thermal load estimation module, predict a temperature for the electronic system 300 based on the stored sensed temperatures 227 and the temperature offset, compare the predicted temperature to one or more thresholds, and execute a thermal mitigation procedure in the event that the predicted temperature exceeds a threshold. Thus, in this particular embodiment, the thermal management module 307 implements thermal mitigation procedures based on inputs from the temperature sensor or sensors 205 and the solar thermal load estimation module 305. In the embodiment of the processing subsystem 201 illustrated in FIG. 2, the functions of the location determining module 303, solar thermal load estimation module, and thermal management module 307 are performed by the processing subsystem 201.

Operation of the electronic system 200, 300 in accordance with exemplary embodiments of the present invention may be further understood with reference to FIGS. 2-4. Referring to FIG. 4, a logic flow diagram 400 is depicted illustrating steps executed by the electronic system 200, 300 to perform thermal management by proactively taking into account solar thermal loading, in accordance with an exemplary embodiment of the present invention. The logic flow steps may be executed by various components of the electronic system 200, 300, including, but not limited to, the processing subsystem 201, 301 (and its constituent hardware and/or software modules 303-307), the memory 203, the temperature sensor(s) 205, and the display 209. The steps executed by the processing subsystem 201, 301 and its constituent software modules are preferably performed in accordance with the operating instructions 225 (e.g., one or more computer programs) stored in the memory 203.

According to the logic flow of FIG. 4, the electronic system 200, 300 determines (401) its location using any one or more of a variety of conventional location-determining technologies. The determination of the system's location may include a determination of the system's then-current location, and optionally determination of a destination location and an expected route of travel. For example, where the system 200, 300 is a wireless communication device (such as a smartphone, cellular phone, or tablet computer) that includes a GPS receiver and associated processing software, the system 200, 300 may determine its current location using conventional processing of received GPS signals. Alternatively, the system 200, 300, or its processing subsystem 201, 301 and/or location determining module 303, may estimate the system's location using other conventional techniques, such as triangulation based on receipt of base station signals from three different fixed cellular antennas. Where the system 200, 300 also has access to location mapping or navigation applications, the system 200, 300 may optionally determine its destination location based on user input into the navigation application and may optionally determine an expected route of travel based on an output of the navigation application. The electronic system 200, 300 may determine its location repeatedly over time (e.g., continuously, periodically, in response to trigger events (such as, for example, in response to placement of the system 200, 300 in a vehicle docking station), or at such other times as may be desired) to facilitate more accurate maximum temperature predictions as described in more detail below.

Besides determining its general geographic location, the electronic system 200, 300 may determine additional details relating to its location. For example, the electronic system 200, 300 may include spatial cognition features, such as capacitive or magnetic sensors distributed about a periphery of the system (which may work in concert with capacitors or magnets placed on the docking station), one or more proximity sensors, one or more infrared sensors, one or more light sensors, an accelerometer, a gyroscope, or one or more temperature sensors, that allow the system 200, 300 to determine whether it is being handheld or has been placed into a docking station (e.g., in a vehicle). Such finer details relating to the electronic system's location may be used either alone or in combination with other sensors to determine whether the system 200, 300 is likely to be exposed to solar heating during operation, as discussed in more detail below.

In addition to determining its location, the electronic system 200, 300 determines (403) a then-current temperature for the system 200, 300. For example, according to one exemplary embodiment, the processing subsystem 201, 301 receives outputs (e.g., voltages) from one or more temperature sensors 205 positioned at various locations within, on, and/or proximate to the electronic system 200, 300 and converts the outputs to sensed temperatures based on stored lookup tables for the temperature sensors 205. The sensed temperatures 227 may be stored in the memory 203.

The temperature sensors 205 may be arranged to monitor the temperatures of critical system components or subsystems, such as the rechargeable battery subsystem, the wireless transmitter subsystem or power amplifier, the central processor subsystem, and/or an internal camera subsystem for a wireless communication device. Additionally or alternatively, a temperature sensor 205 may monitor a surface temperature of a housing of the electronic system 200, 300, such as when the electronic system 200, 300 is a device that may be exposed to external heating from the sun or other sources. Those of ordinary skill in the art will readily recognize and appreciate that the subsystems and/or components of the electronic system 200, 300 requiring temperature monitoring may vary from those listed above depending on the functions and features of the particular electronic system 200, 300 in which the present invention is implemented. The electronic system 200, 300 may determine and store sensed temperatures 227 on a regular basis (e.g., continuously, periodically, in response to trigger events, or at such other times as may be desired) to facilitate more accurate maximum temperature predictions, as described in more detail below.

After determining sensed temperatures 227 based on the temperature sensor outputs, the processing subsystem 201, 301 may, according to one embodiment, select a maximum temperature of the sensed temperatures 227 as the then-current temperature for the electronic system 200, 300. Alternatively, the current temperature of the electronic system 200, 300 may be determined as the temperature derived from a preselected temperature sensor 205 or from the sole temperature sensor 205, where the system 200, 300 includes only one temperature sensor 205. Still further, the current temperature for the electronic system 200, 300 may be determined as an average or weighted average of the sensed temperatures 227.

The current temperature for the electronic system 200, 300 may be determined on a regular basis to improve the accuracy of the system's predicted future temperatures, as described in more detail below. For example, the system's current temperature may be determined based on sensed temperatures 227 derived at fifteen minute intervals. Of course, other shorter or longer time intervals may be selected based on a variety of factors, such as, for example, the physical size of the particular electronic system 200, 300, the heating profile of the system 200, 300, the type of material or materials from which the system housing or docking station is made, whether certain applications or combinations of applications and processes requiring heavier processor loading or other substantial use of power have been recently started (e.g., shorter or finer measurement periods may be required at application start-up so as to capture the heating slope due to the application), whether the temperature change between measurements indicates a steep heating slope, whether the expected route of travel includes many changes of direction, whether weather alerts that could quickly change solar loading have been received from weather reporting entities, and/or whether the electronic system 200, 300 is in an environment that includes active cooling.

Besides determining a location and a current temperature, the electronic system 200, 300 may optionally determine (405) whether it is likely to be exposed to solar heating during operation. For example, according to one embodiment, the electronic system 200, 300 may include a solar sensor 207 (or optionally an optical sensor) positioned on or near a surface of the electronic system 200, 300. The output of the solar sensor 207 may be a voltage that varies according to the level of solar energy (flux) detected by the sensor 207. A voltage threshold may be stored in memory 203 and compared by the processing subsystem 201, 301 to the output of the solar sensor 207 to determine whether the system 200, 300 is in a sunlit environment. If the solar sensor output is above the threshold, the processing subsystem 201, 301 may determine that the electronic system 200, 300 is likely to be exposed to solar heating during operation. For example, the threshold may be set to distinguish between sunlit environments and generated light environments.

Alternatively or additionally, as discussed above with regard to determining the electronic system's location, the electronic system 200, 300 may determine spatial cognition features and use those features to assist in determining whether the system 200, 300 is likely to be exposed to solar heating during use. For instance, the processing subsystem 201, 301 may receive a signal from a spatial cognition sensor indicating that the electronic system 200, 300 is being held by the user or has been placed into a vehicular docking station. In such a case, the processing subsystem 201, 301 may use such an indication either alone or together with the output from the solar sensor 207 to determine that the system 200, 300 is likely to be used in an environment subject to solar heating.

In the event that the electronic system 200, 300 is configured to determine its likely exposure to solar heating and the processing subsystem 201, 301 determines that solar heating exposure is unlikely, the electronic system 200, 300 may perform (407) thermal management based solely on its then-current temperatures as sensed by the temperature sensors 205 in accordance with conventional thermal management techniques. In other words, if the electronic system 200, 300 is configured to use the system's likely exposure to solar heating as a trigger for performing further evaluation of the solar loading impact on thermal management, the electronic system 200, 300 proceeds with conventional thermal management techniques when solar heating exposure is unlikely. Such an approach would save processing resources of the processing subsystem 201, 301 by limiting the performance of solar thermal load-based thermal management analysis to those times in which solar thermal load impact is most likely.

By contrast, if the electronic system 200, 300 is configured to determine its likely exposure to solar heating and the processing subsystem 201, 301 determines that solar heating exposure is likely, or the electronic system 200, 300 is configured to determine the solar thermal load impact (if any) on thermal management in all cases, the electronic system 200, 300 determines (409) a solar thermal load value based on the determined location of the system 200, 300. The solar thermal load value represents the solar thermal load expected to affect the system's location. In one exemplary embodiment, the solar thermal load value may be determined by the processing subsystem 201, 301, or its solar thermal load estimation module 305, by requesting solar flux data based on the system's location from a solar flux prediction application or model, such as the NREL SMARTS model, running on a server or other host accessible by the electronic system 200, 300 through its wireless modem 221, stored locally in the electronic system 200, 300, or made available through a mobile software application stored on and executable by the electronic system 200, 300. Alternatively, the acquired solar flux data may be further processed based on actual and forecast weather data acquired from the host or a third party, such as the National Weather Service, to produce the solar thermal load value at the electronic system's location. For example, the host or the electronic system's processing subsystem 201, 301 may use the weather data to predict surface level solar exposure at the electronic system's location (e.g., taking into account cloud cover and other weather-related phenomenon) and adjust the solar flux data provided by the solar flux application or model if the solar flux application or model provides its data under the assumption of clear-sky conditions. The solar thermal load value may be updated as necessary to take into account updates in solar flux data as determined by the solar flux application or model and/or updates in weather forecast data.

Where determination of the system's location includes an expected route of travel, the determination of solar thermal load value may include estimating a solar thermal load profile for all or part of the expected route of travel. For example, the expected route of travel may be divided into multiple segments based on the output of a navigation or mapping program. In such a case, the processing subsystem 201, 301 may estimate a solar thermal load value for each route segment or may estimate solar thermal load values for selected route segments. Each route segment's solar thermal load value may be estimated by accessing a solar flux application or model and/or weather service data, as described above. In one exemplary embodiment, each segment may be of equal distance or of equal estimated travel time as projected by a navigation program accessed or executed by the processing subsystem 201, 301. Alternatively, the route segments may be of varying distances or estimated travel time durations. The collection of solar thermal load values for the expected route of travel constitutes the solar thermal load profile for the expected route of travel, or for the parts of the route for which solar thermal load values have been determined, and may be stored in the memory 203. A solar thermal load profile may also be determined for a single location by determining a set of solar thermal load values expected for a future period of time (e.g., the next hour in fifteen minute increments). The solar thermal load profile may be updated as necessary to take into account updates in solar flux data as determined by the solar flux application or model and/or updates in weather forecast data.

After at least one solar thermal load value has been determined for the current location of the electronic system 200, 300, the expected travel route of the electronic system 200, 300, or at least one segment of the expected travel route, the electronic system 200, 300 determines (411) one or more temperature offset values for the system 200, 300 based on the solar thermal load value. In one exemplary embodiment, the processing subsystem 201, 301 retrieves the temperature offset value or values from the temperature offset value lookup table 229, which was stored in memory 203 prior to execution of the thermal management process (e.g., during fabrication or initial setup of the electronic system 200, 300). Where a solar thermal load profile has been determined and stored in memory 203, the retrieved temperature offset value may be based on the applicable segment of the expected travel route to which the solar thermal load profile applies or the particular time segment for which thermal management analysis is being performed. As discussed above, the temperature offset value is the increase in temperature (e.g., in °C.) expected to be incurred by the electronic system 200, 300 as a result of being exposed to the determined solar thermal load value (e.g., in W/m²).

Having determined a current temperature for the electronic system 200, 300 and a temperature offset value based on a solar thermal load expected to affect the location of the system 200, 300, the electronic system 200, 300 predicts (413) a maximum temperature for the system 200, 300 during a particular time segment based on the temperature offset and the then-current system temperature. According to one embodiment, the processing subsystem 201, 301 (or its thermal management module 307) predicts a maximum temperature by summing the temperature offset value for the time segment and the then-current temperature for the system 200, 300. In other words, the temperature offset value in this embodiment is the predicted rise in system temperature due to the solar thermal loading expected to occur during the particular time segment for which the prediction is being made.

The maximum temperature for the electronic system 200, 300 may be predicted (413) on a regular basis to improve the accuracy of the system's predicted future temperatures. For example, the system's maximum temperature may be predicted for fifteen or thirty minute intervals. Of course, other shorter or longer time intervals may be selected based on a variety of factors, such as, for example, the physical size of the particular electronic system 200, 300, the heating profile of the system 200, 300, the type of material or materials from which the system housing or docking station is made, whether certain applications or combinations of applications and processes requiring heavier processor loading or other substantial use of power have been recently started (e.g., shorter or finer measurement periods may be required at application start-up so as to capture the heating slope due to the application), whether the temperature change between predictions indicates a steep heating slope, whether the expected route of travel includes many changes of direction, whether weather alerts that could quickly change solar loading have been received from weather reporting entities, and/or whether the electronic system 200, 300 is in an environment that includes active cooling.

After a maximum system temperature has been predicted for a particular time interval, the system 200, 300 compares (415) the predicted temperature to one or more thresholds which may be stored in the memory 203. Where only a single threshold is used, the processing subsystem 201, 301 (or its thermal management module 307) compares the predicted maximum temperature to the threshold and either performs (407) thermal management based on the then-current temperature of the electronic system 200, 300 in accordance with conventional, reactive thermal management protocols (when the predicted maximum is less than the threshold) or proactively executes (417) a thermal mitigation procedure in advance of attaining the predicted maximum temperature (when the predicted maximum is greater than the threshold). The thermal mitigation procedure 231 may be stored as a thermal management process or software program in the memory 203.

Where a single threshold is used and the predicted maximum temperature is greater than the threshold during the particular time interval, the thermal mitigation procedure 231 executed by the processing subsystem 201, 301 (or its thermal management module 307) may be an aggressive mitigation procedure because the processing subsystem 201, 301 has predicted that the system temperature will soon be unacceptably high. For example, the thermal mitigation procedure 231 may include at least one of reducing a maximum operating frequency of the application processor 215, reducing a refresh rate for the display 209, reducing an upload data rate of the wireless or wired modem 221, 309, reducing a download data rate of the modem 221, 309, reducing a brightness of the display 209, reducing battery charging rate, initiating active cooling of the electronic system 200, 300, reducing average modem transmitter power, closing low priority applications, reducing frequency of the GPU 211, and/or increasing the wakeup intervals for background processes and/or applications. Alternatively or additionally, the processing subsystem 201, 301 may estimate a time at which the predicted maximum temperature will occur and expedite performance of one or more functions so as to perform the function or functions prior to the estimated time. For example, the processing subsystem 201, 301 may estimate a time at which the predicted maximum temperature will occur by evaluating the solar flux data (e.g., flux versus time) for the electronic system's location and determining a time at which the solar flux will be at its maximum or at least great enough to cause the predicted maximum temperature of the electronic system 200, 300 to exceed the threshold. The functions performed in advance may include functions that will be negatively affected by the thermal mitigation procedure, such as downloading or saving data for various applications (e.g., navigation and music applications).

Still further, in response to determining that the predicted maximum temperature is greater than the threshold, but before commencing certain actions intended to reduce the temperature of the electronic system (e.g., such as reducing application processor speed or frequency), the thermal management process may communicate a thermal mitigation notification to currently running applications. The thermal mitigation notification may inform the currently running applications of impending thermal mitigation action to be taken by the processing subsystem and/or specify an amount of time before such mitigation action is to commence to allow the applications to take their own preventative actions (e.g., saving data, completing transmissions or receptions, or taking other mitigation actions) before extensive thermal mitigation action begins for the electronic system as a whole. In one embodiment, the applications may be pre-configured to subscribe to thermal mitigation notifications from the thermal management process. For example, the format and other configuration of the thermal mitigation notification may form part of an application programming interface (API) supplied to developers of applications created to operate in the electronic system.

Still further, where an expected route of travel and a solar thermal load profile have been determined for the system 200, 300, the processing subsystem 201, 301 may estimate a speed of travel for the system 200, 300 by processing data from a navigation application in accordance with known techniques. The processing subsystem 201, 301 may also estimate a time at which the predicted maximum temperature will occur based on the solar thermal load profile and the speed of travel, and perform one or more functions prior to the estimated time at which the predicted maximum temperature is to occur. Thus, where a solar thermal load profile for the system 200, 300 along an expected route of travel indicates varying solar thermal load levels along the travel route, the processing subsystem 201, 301 may estimate the time or times required for the system 200, 300 to reach one or more segments along the route at which the predicted maximum temperature will occur given the system's speed of motion.

Having knowledge of approximately how much time remains before the predicted maximum temperature is reached and a thermal mitigation procedure is commenced, the processing subsystem 201, 301 can perform certain functions that are likely to be impacted by the thermal mitigation procedure prior to arriving at the route segment at which the predicted maximum temperature is likely to occur. For example, if the solar thermal load profile for the system 200, 300 indicates that the solar thermal load will cause the system temperature to increase by 10° C. at a distance of 20 kilometers (km) (about 12 miles) along the system's expected route of travel, thereby resulting in a predicted maximum temperature above a predefined threshold, and the processing subsystem 201, 301 determines that the system 200, 300 is traveling at a speed of 100 km per hour (km/h), then the processing subsystem 201, 301 may determine that the predicted maximum temperature will be reached in about 12 minutes. Accordingly, the processing subsystem 201, 301 may use the available 12 minutes to perform certain functions, such as downloading or uploading data and/or broadcasting a notice to currently running subscribed applications to proactively perform protective actions (e.g., save data, mitigation actions, etc.), before the system 200, 300 reaches the point along the travel route at which thermal mitigation is likely to occur.

In an alternative embodiment, the processing subsystem 201, 301 may use or access a navigation or mapping application and a solar thermal load estimation tool(s) (e.g., NREL SMARTS model and/or weather service data) to determine an alternative route of travel for the electronic system 200, 300 as part of executing a thermal mitigation procedure. The alternative route would be chosen such that the system 200, 300 would be expected to incur less solar heating along the alternative route than along the original expected route. The alternative route may be displayed on a display of the electronic system 200, 300 for use by a user of the system 200, 300.

In a further alternative embodiment, multiple temperature thresholds may be stored in memory 203 and used to trigger multiple thermal mitigation procedures 231 that provide gradual thermal mitigation due to solar heating. According to this embodiment, the processing subsystem 201, 301 (or its thermal management module 307) may compare (415) the predicted maximum temperature to a first threshold, which may be associated with a more aggressive thermal mitigation procedure. If the predicted maximum temperature exceeds the first threshold, the processing subsystem 201, 301 executes (417) the associated thermal mitigation procedure. If the predicted maximum temperature does not exceed the first threshold, the processing subsystem 201, 301 compares (415) the predicted maximum temperature to a second, lower threshold, which may be associated with a less aggressive thermal mitigation procedure. If the predicted maximum temperature exceeds the second threshold such that the predicted maximum temperature is between the first and second thresholds, the processing subsystem 201, 301 executes (417) the less aggressive thermal mitigation procedure. As noted above, the maximum temperature for the electronic system 200, 300 may be predicted (413) on a regular basis to improve the accuracy of the system's predicted future temperatures and to insure that appropriate thermal mitigation is executed in a proactive manner. The frequency at which the system's maximum temperature is predicted may be based on a variety of factors as discussed above. Additionally, the quantity of thresholds and associated thermal mitigation procedures may be chosen to achieve a desired thermal management approach for the particular electronic system 200, 300.

To illustrate an exemplary application of the multiple temperature threshold embodiment described above, assume that three thresholds and three thermal mitigation procedures 231 are stored in memory 203. The first threshold may be 80° C. and be associated with a thermal mitigation procedure that requires the application processor 215, which normally operates at a frequency of 1.72 GHz, to reduce its then-current processing frequency to 918 MHz as well as perform an advance download of maps when executing a navigation application. The second threshold may be 73° C. and be associated with a thermal mitigation procedure that requires the application processor 215 to reduce its then-current processing frequency to 1.24 GHz. Finally, the third threshold may be 70° C. and be associated with a thermal mitigation procedure that requires the application processor 215 to reduce its then-current processing frequency to 1.50 GHz. Additionally, a temperature offset value lookup table 229 stored in memory 203 may include the following laboratory-determined data for the particular electronic system 200, 300 exposed to solar thermal heating:

TABLE 1

| Solar Flux (q) | Temp. Offset Value (° C.) |
|---|---|
| q > 800 W/m$^2$ | 10 |
| 800 W/m$^2$ > q > 500 W/m$^2$ | 5 |
| 500 W/m$^2$ > q > 100 W/m$^2$ | 2 |

Based on the foregoing exemplary thresholds and temperature offset lookup table data, if the processing subsystem 201, 301 receives outputs from one or more temperature sensors 205, determines (403) that the then-current temperature of the system 200, 300 is 68.4° C. (e.g., by using the highest temperature derived from a temperature sensor output), and determines (409) that the system 200, 300 can be expected to incur 600 W/m$^2$ of solar flux within the next 15 minutes along its current expected route of travel, the processing subsystem 201, 301 would determine (411) from the temperature offset lookup table 229 that the expected temperature rise due to solar heating is 5° C. and predict (413) a maximum system temperature of 73.4° C., which is to occur in the next 15 minutes. The processing subsystem 201, 301 would then compare (415) the predicted maximum temperature to either all three thresholds or, more logically, to the first threshold and then, upon determining that the predicted temperature is less than the first threshold, to the second threshold. Because the predicted maximum temperature falls between the top two thresholds (between 73° C. and 80° C.), the processing subsystem 201, 301 would retrieve the intermediate thermal mitigation procedure 231 from memory 203 and execute (417) it by lowering the processing frequency of the application processor 215 from 1.72 GHz to 1.24 GHz, as well as taking any other action that may be included in the intermediate thermal mitigation procedure 231. By taking such proactive action, the processing subsystem 201, 301 avoids or at least delays having to take the more aggressive thermal mitigation action of reducing the application processor frequency to 918 MHz and performing an advance download of navigation maps (assuming execution of a navigation application). Thus, as illustrated by this example, multiple threshold embodiments of the present invention may facilitate a gradual reduction of system performance in anticipation of rising temperatures due to solar heating in an effort to keep the system temperature below a critical level.

The present invention encompasses an electronic system and a method for thermal management therein taking into account solar thermal loading. With this invention, an electronic system or a processing subsystem used therein may predict a rise in system temperature due to expected solar thermal loading and proactively perform thermal mitigation in an effort to prevent potential thermal overload. Additionally, the predictive nature of the present invention enables the electronic system to perform certain actions in advance of a reduction in system performance or functionality, which is expected to occur in the near future due to an anticipated rise in temperature caused by solar-related heating. Further, through the optional use of multiple thresholds and multiple associated thermal mitigation procedures, the present invention facilitates a gradual reduction in system performance over time so as to minimize the effects on the system user and potentially avoid the use of more extreme thermal mitigation measures. Thus, the present invention provides an improved thermal management approach for electronic systems exposed to solar radiation.

As detailed above, embodiments of the present invention reside primarily in combinations of method steps and/or apparatus components related to performing thermal management in an electronic system that is subject to solar heating. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual relationship or order between such entities or actions. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements but may include other elements not expressly listed or inherent to such process, method, article, or apparatus. The term "plurality" of as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the electronic system 200, 300 described herein may be comprised of one or more conventional processors and unique stored program instructions that control the processor(s) to implement, in conjunction with certain non-processor circuits, some, most, or all of the functions of the electronic system 200, 300 and its operational methods as described herein. The non-processor circuits may include, but are not limited to, storage devices (such as memory 203), temperature sensors 205, the solar sensor 207, the display 209, the user interface 213, the power management circuit 217, modems 221, 309, the solar antenna system 223, and hardware portions of the solar thermal load estimation module 303 and the other processing subsystem modules described above, as well as filters, clock circuits, and various other non-processor circuits. As such, the functions of the processor and non-processor circuits may be collectively interpreted as steps of a method for thermal management in an electronic system. Alternatively, some or all functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the appended claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims and all equivalents of those claims as issued.

What is claimed is:

1. A method for thermal management in an electronic system; the method comprising:
    determining a location of the electronic system;
    determining a likelihood that the electronic system will be exposed to solar heating during operation based on at least one factor from the following factors: a current time of day; current day, or the location of the electronic system; and
    in response to determining that the likelihood is greater than an initial threshold:
        determining a solar thermal load value representing a solar thermal load expected to affect the location of the electronic system;
        determining a temperature offset value based on the solar thermal load value; determining a predicted future temperature for the electronic system based on the temperature offset value and a current temperature for the electronic system;
        comparing the predicted future temperature to at least one of a plurality of thresholds comprising at least a first threshold and a second threshold;
    and based on the comparison:
        if the predicted future temperature is equal to or exceeds the first threshold, then executing a first thermal mitigation procedure;
        if the predicted future temperature is between the first threshold and the second threshold, then executing a second thermal mitigation procedure; and
        if the predicted future temperature is equal to or less than the second threshold, then executing a third thermal mitigation procedure.

2. The method of claim 1, wherein executing the first and second thermal mitigation procedure comprises at least one of reducing a maximum operating frequency of an application processor of the electronic system, reducing a refresh rate for a display of the electronic system, reducing an upload data rate, reducing a download data rate, reducing a brightness of the display, reducing a battery charging rate, initiating active cooling of the electronic system, reducing average modem transmitter power, closing low priority applications, reducing frequency of a graphics processing unit, and increasing wakeup intervals for background processes and applications.

3. The method of claim 1, wherein determining the predicted future temperature for the electronic system comprises:
summing the temperature offset value and the current temperature for the electronic system.

4. The method of claim 1, further comprising:
receiving outputs from one or more temperature sensors during operation of the electronic system;
determining one or more temperatures corresponding to the outputs from the one or more temperature sensors to produce one or more sensed temperatures; and
selecting a maximum temperature from the one or more sensed temperatures as the current temperature for the electronic system.

5. The method of claim 1, wherein determining the location of the electronic system comprises:
determining an expected route of travel for the electronic system based on a current location of the electronic system and a destination location for the electronic system.

6. The method of claim 5, wherein determining the solar thermal load value comprises:
estimating a solar thermal load profile for at least part of the expected route of travel.

7. The method of claim 6, wherein executing the first and second thermal mitigation procedure comprises:
estimating a speed of travel for the electronic system along the expected route of travel;
estimating a time at which the predicted future temperature will occur based on the solar thermal load profile and the speed of travel; and
performing one or more functions prior to the time at which the predicted future temperature is expected to occur.

8. The method of claim 6, wherein the expected route of travel includes a plurality of route segments and wherein estimating a solar thermal load profile for at least part of the expected route of travel comprises:
estimating the solar thermal load for each route segment of the plurality of route segments.

9. The method of claim 5, wherein the electronic system includes a display and wherein executing the first or second thermal mitigation procedure comprises:
determining an alternative route of travel from the current location to the destination location, wherein the alternative route of travel is expected to incur less solar heating than the expected route of travel; and
displaying the alternative route of travel on the display of the electronic system.

10. The method of claim 1, wherein executing the first and second thermal mitigation procedure comprises:
estimating a time at which the predicted future temperature will occur; and
expediting performance of one or more functions so as to perform the one or more functions prior to the time at which the predicted future temperature is expected to occur.

11. The method of claim 1, wherein the electronic system executes at least one application during operation thereof and wherein executing the first and second thermal mitigation procedure comprises:
communicating a notification to the at least one application in response to determining that the predicted future temperature exceeds the at least one threshold, the notification informing the at least one application of impending thermal mitigation action to be taken by the electronic system.

12. The method of claim 1, wherein in response to determining that the likelihood is less than the initial threshold:
comparing the current temperature to at least one of the plurality of thresholds; and
based on the comparison:
if the current temperature is equal to or exceeds the first threshold, then executing the first thermal mitigation procedure;
if the current temperature is between the first threshold and the second threshold, then executing the second thermal mitigation procedure; and
otherwise, refraining from executing the first and second thermal mitigation procedures.

13. The method of claim 1, wherein determining the likelihood that the electronic system will be exposed to solar heating during operation is further based on at least one factor from the following factors: a level of solar energy detected by a sensor of the electronic system, or a spatial cognition feature of the electronic system.

14. A method for thermal management in a portable electronic device, the method comprising:
determining a current location of the portable electronic device;
determining an expected route of travel for the portable electronic device based on the current location and a destination location;
determining a likelihood that the portable electronic device will be exposed to solar heating during operation based on at least one factor from the following factors: a current time of day, current day, or the location of the portable electronic device; and
in response to determining that the likelihood is greater than an initial threshold:
determining a solar thermal load profile for at least part of the expected route of travel;
determining a temperature offset value based on the solar thermal load profile; determining a predicted future temperature for the portable electronic device based on the temperature offset value and a current temperature for the portable electronic device;
comparing the predicted future temperature to at least one of a plurality of thresholds comprising at least a first threshold and a second threshold;
and based on the comparison:
if the predicted future temperature is equal to or exceeds the first threshold, then executing a first thermal mitigation procedure;
if the predicted future temperature is between the first threshold and the second threshold, then executing a second thermal mitigation procedure; and
if the predicted future temperature is equal to or less than the second threshold, then executing a third thermal mitigation procedure.

15. The method of claim 14, wherein executing the first and second thermal mitigation procedure includes at least one of reducing a maximum frequency of an application processor of the portable electronic device, reducing a refresh rate for a display of the portable electronic device, reducing an upload data rate, reducing a download data rate, reducing a brightness of the display, reducing a battery charging rate, initiating active cooling of the electronic system, reducing average modem transmitter power, closing low priority applications, reducing frequency of a graphics processing unit, and increasing wakeup intervals for background processes and applications.

16. The method of claim 14, further comprising:
receiving outputs from one or more temperature sensors during operation of the portable electronic device;
determining one or more temperatures corresponding to the outputs from the one or more temperature sensors to produce one or more sensed temperatures; and
selecting a maximum temperature from the one or more sensed temperatures as the then-current temperature for the portable electronic device.

17. The method of claim 14, wherein executing the first and second thermal mitigation procedure comprises:
estimating a speed of travel for the portable electronic device along at least part of the expected route of travel;
estimating a time at which the predicted future temperature will occur based on the solar thermal load profile and the speed of travel; and
performing one or more functions prior to the time at which the predicted future temperature is expected to occur.

18. The method of claim 14, wherein the portable electronic device includes a display and wherein executing the first or second thermal mitigation procedure comprises:
determining an alternative route of travel from the current location to the destination location, wherein the alternative route of travel is expected to incur less solar heating than the expected route of travel; and
displaying the alternative route of travel on the display of the portable electronic device.

19. An electronic system comprising:
at least one temperature sensor that produces at least one output representative of one or more sensed temperatures; and
a processing subsystem operably coupled to the at least one temperature sensor and operable in accordance with stored operating instructions to: determine a location of the electronic system;
determine a likelihood that the electronic system will be exposed to solar heating during operation based on at least one factor from the following factors: a current time of day, current day, or the location of the electronic system; and
in response to determining that the likelihood is greater than an initial threshold: determine a solar thermal load value representing a solar thermal load expected to affect the location of the electronic system;
determine a temperature offset value based on the solar thermal load value;
receive the at least one output from the at least one temperature sensor; determine one or more temperatures based on the at least one output from the at least one temperature sensor to produce at least one sensed temperature;
determine a predicted future temperature for the electronic system based on the temperature offset value and the at least one sensed temperature;
compare the predicted future temperature to at least one of a plurality of thresholds comprising at least a first threshold and a second threshold;
and based on the comparison:
if the predicted future temperature is equal to or exceeds the first threshold, then execute a first thermal mitigation procedure;
if the predicted future temperature is between the first threshold and the second threshold, then execute a second thermal mitigation procedure; and
if the predicted future temperature is equal to or less than the second threshold, then execute a third thermal mitigation procedure.

20. The electronic system of claim 19, wherein the processing subsystem is further operable in accordance with the stored operating instructions to determine the location of the electronic system by:
determining an expected route of travel for the electronic system based on a current location of the electronic system and a destination location for the electronic system.

21. The electronic system of claim 20, further comprising:
a display operably coupled to the processing subsystem;
wherein the processing subsystem is further operable in accordance with the stored operating instructions to execute a thermal mitigation procedure by:
determining an alternative route of travel from the current location to the destination location, wherein the alternative route of travel is expected to incur less solar heating than the expected route of travel; and
displaying the alternative route of travel on the display.

22. The electronic system of claim 19, further comprising:
memory operable to store a lookup table of temperature offset values versus solar thermal load values;
wherein the processing subsystem is operable to determine the temperature offset value from the lookup table.

23. The electronic system of claim 19, wherein the processing subsystem is further operable in accordance with the stored operating instructions to execute the first and second thermal mitigation procedure by:
estimating a time at which the predicted future temperature will occur; and
expediting performance of one or more functions to as to perform the one or more functions prior to the time at which the predicted future temperature is expected to occur.

24. The electronic system of claim 19, wherein the electronic system executes at least one application during operation thereof and wherein the processing subsystem is further operable to in accordance with the stored operating instructions to execute the first and second thermal mitigation procedure by:
communicating a notification to the at least one application in response to determining that the predicted future temperature exceeds the at least one threshold, the notification informing the at least one application of impending thermal mitigation action to be taken by the processing subsystem.

* * * * *